(12) United States Patent
Kikugawa (10) Patent No.: US 8,243,573 B2
(45) Date of Patent: Aug. 14, 2012

(54) HIGH-SPEED OPTICAL DISK DRIVE

(75) Inventor: Atsushi Kikugawa, Tokyo (JP)

(73) Assignees: Hitachi, Ltd., Tokyo (JP); Hitachi—LG Data Storage, Inc., Tokyo (JP)

( * ) Notice: Subject to any disclaimer, the term of this patent is extended or adjusted under 35 U.S.C. 154(b) by 405 days.

(21) Appl. No.: 12/362,378

(22) Filed: Jan. 29, 2009

(65) Prior Publication Data

US 2009/0196156 A1 Aug. 6, 2009

(30) Foreign Application Priority Data

Feb. 1, 2008 (JP) ................................ 2008-022924

(51) Int. Cl.
*G11B 7/00* (2006.01)
(52) U.S. Cl. ................................ 369/59.21; 369/124.05
(58) Field of Classification Search ................ 369/59.11, 369/59.14–59.16, 59.19–59.22, 47.5, 124.04, 369/124.05, 124.1–124.13, 47.35
See application file for complete search history.

(56) References Cited

U.S. PATENT DOCUMENTS

| | | | |
|---|---|---|---|
| 5,327,298 A | 7/1994 | Ottesen et al. | |
| 5,359,473 A | 10/1994 | Kaniwa et al. | |
| 5,786,951 A | 7/1998 | Welland et al. | |
| 6,304,538 B1 * | 10/2001 | Hayashi | 369/59.22 |
| 6,914,867 B2 * | 7/2005 | Tonami | 369/59.22 |
| 2002/0159350 A1 * | 10/2002 | Ogura et al. | 369/47.35 |
| 2004/0190404 A1 * | 9/2004 | Konishi et al. | 369/44.11 |
| 2005/0078588 A1 | 4/2005 | Arai | |
| 2005/0122865 A1 | 6/2005 | Kim | |
| 2005/0207516 A1 * | 9/2005 | Tonami | 375/341 |
| 2006/0123328 A1 * | 6/2006 | Tonami et al. | 714/801 |
| 2007/0053262 A1 * | 3/2007 | Kikugawa et al. | 369/47.28 |
| 2007/0127341 A1 * | 6/2007 | Sagara et al. | 369/59.11 |
| 2009/0034381 A1 * | 2/2009 | Shoji et al. | 369/53.13 |

FOREIGN PATENT DOCUMENTS

| | | |
|---|---|---|
| EP | 0438784 | 7/1991 |
| JP | 2007-73147 | 3/2007 |

OTHER PUBLICATIONS

"Noise Reduction of Diode Laser Video Disc Players with High Frequency Current Superposition" by A. Arimoto, et al.

\* cited by examiner

*Primary Examiner* — Thang Tran
(74) *Attorney, Agent, or Firm* — Mattingly & Malur, PC (57) ABSTRACT

If the read speed is increased while high-frequency modulated carrier is fixed at a constant frequency, it becomes difficult to separate the read signal from the carrier by using bandwidth limitation of the analog system because the upper limit of the read signal band nears to the carrier frequency. Moreover, if the separation between them is eased by raising the carrier frequency, a problem that write-waveform controls become difficult arises. However, the carrier amplitude can be suppressed simultaneously preventing leakage to the read signal band by converting the carrier frequency into the stopband of the adaptive equalizer by making the use of aliasing that occurs at the A/D conversion.

6 Claims, 11 Drawing Sheets

FIG. 10 conditions
PR class: PR(1,2,2,1)ML
15-tap adaptive equalizer
HF. level -14 dB of read signal amplitude, $f_{aliased}=0.23f_{clk}$ results
BER=1449/65664
Resolution(2T)=3%

(a) Eye-pattern (b) Transfer function of adaptive equalizer

HIGH-SPEED OPTICAL DISK DRIVE

CLAIM OF PRIORITY

The present application claims priority from Japanese patent application JP 2008-022924 filed on Feb. 1, 2008, the content of which is hereby incorporated by reference into this application.

FIELD OF THE INVENTION

The present invention relates to technology for reading optical disk drives.

BACKGROUND OF THE INVENTION

The scope of the present invention is not limited to Blu-Ray Discs (BD) but the following description assumes use of the BD and uses the same terminology as in the BD field.

Most optical disk devices including BD use a high-frequency modulation method to limit noise generated by the laser diode that is utilized as the light source. This technology is disclosed in "Kogaku" Vol. 14, No. 5, pp. 377-383. Since this technology is well known in this field, only essential matters are described below and other matters are omitted.

Figure 2:
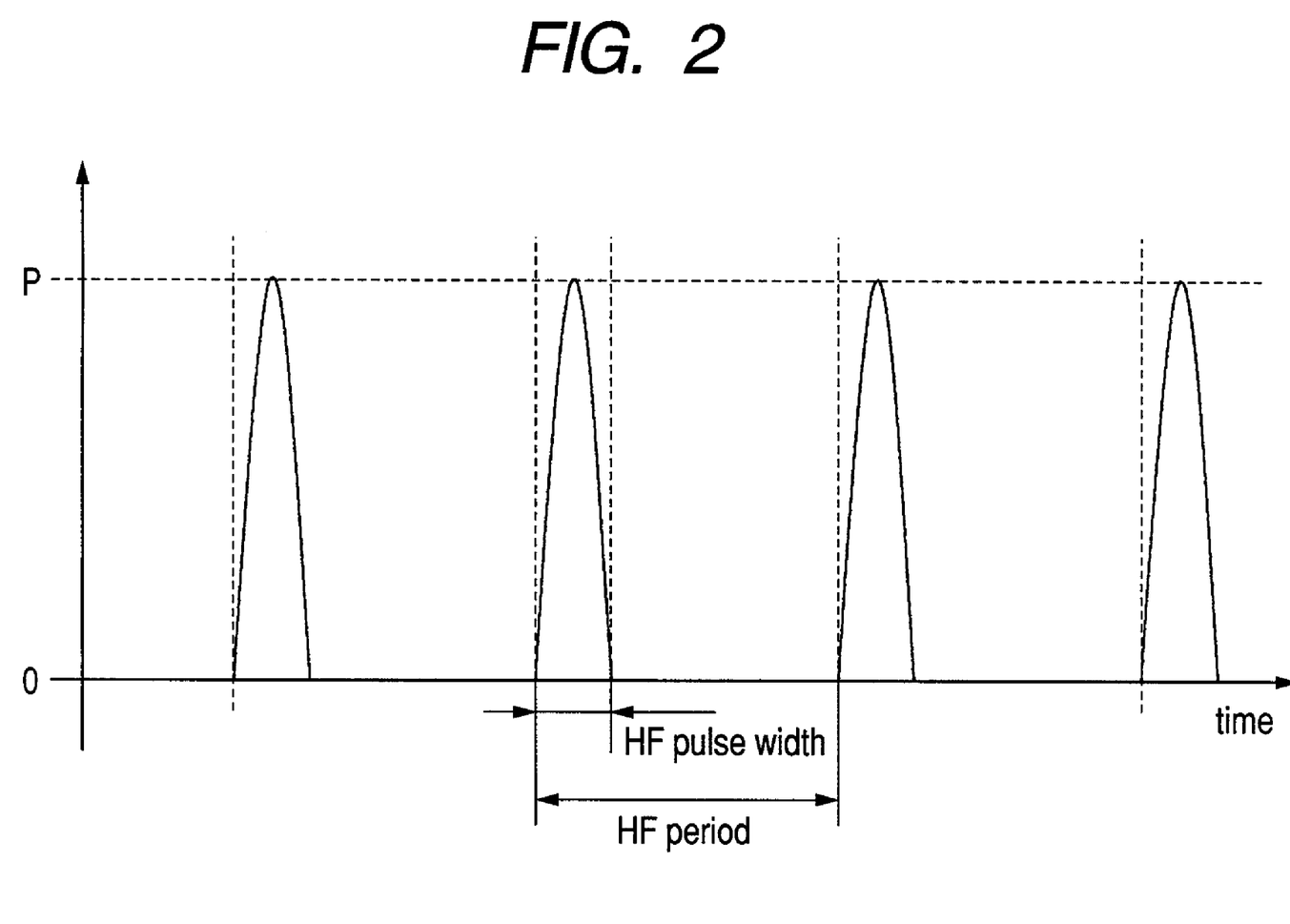
FIG. 2 is a schematic showing the waveform of the pulsed read light by high-frequency modulation.

The oscillation of the laser diode becomes unstable when laser beam reflected from the disk enters the laser diode during oscillation and consequently generates significant laser noise. The high-frequency modulation method is utilized to avoid this laser noise. This technique is called the high-frequency modulation method because a high-frequency signal is superimposed onto the laser diode drive signal to make the laser emit pulsed laser beam. The light in this light waveform is repeatedly turned on and off as shown in FIG. 2. The ratio (duty) of the laser pulse interval (modulation cycle) and light emission period for that laser pulse period here is a parameter for adjusting laser noise to a minimum. In other words, the frequency and the duty are selected so that the laser pulse reflected from the disk does not enter the laser diode while the laser is oscillating.

Figure 3:
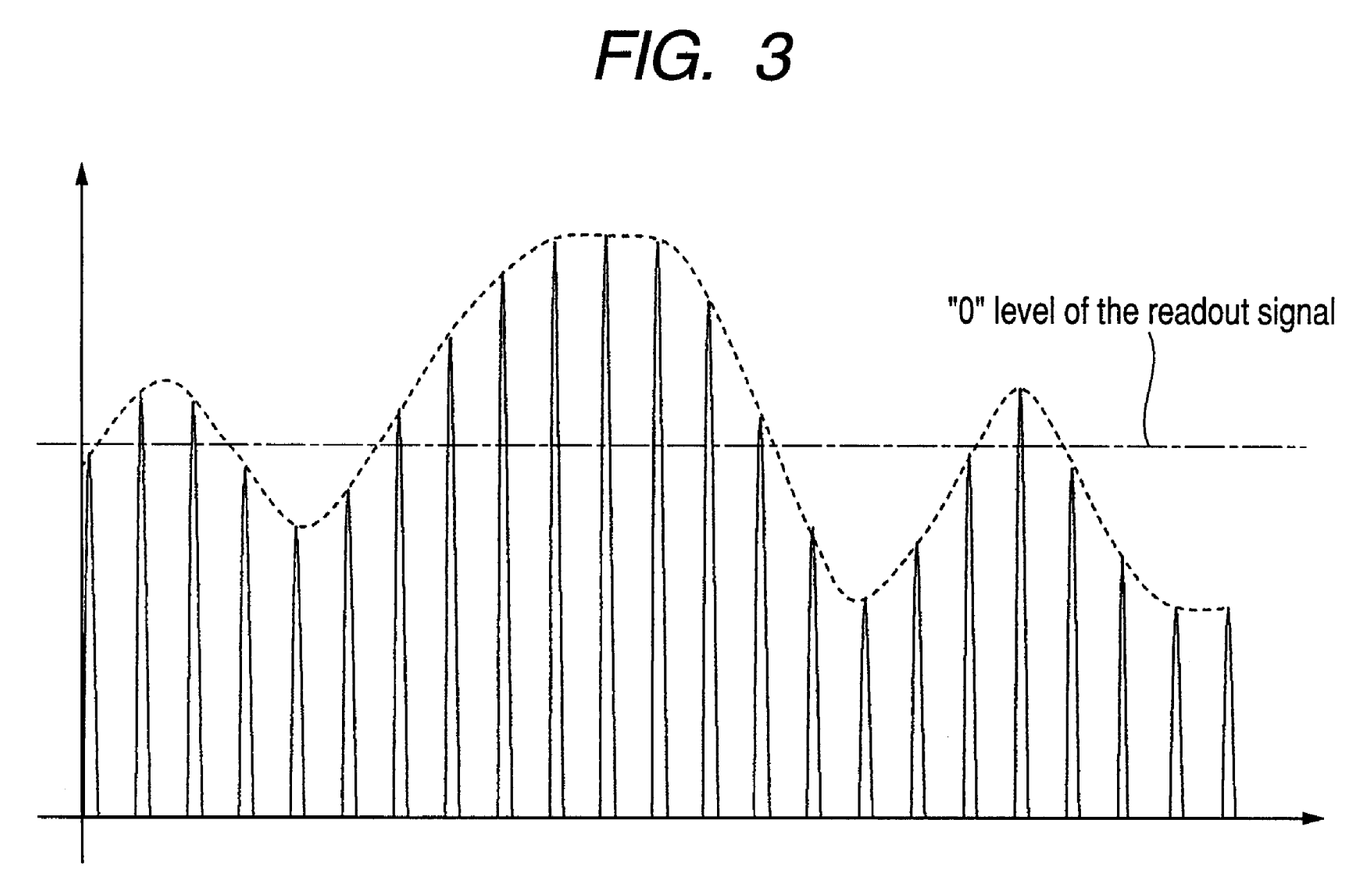
FIG. 3 is a schematic showing the pulsed light reflected from the disk.

The laser beam waveform appears as shown in FIG. 2, so the read signal waveform will appear as shown in FIG. 3, assuming that there are no bandwidth limitations from the photodiode and current-to-voltage converter amplifier used for reading. Such pulsed signal made of read pulse train is hereafter called the pulsed read signal. The broken line in FIG. 3 is the read signal waveform obtained assuming consecutive oscillation at the same output power that of the laser pulse peak power when the high-frequency carrier is superimposed. In other words, the contour of the upper envelope of the pulsed read signal is same as a read signal waveform obtained by consecutive light. The desired read waveform can therefore be obtained by envelope detection, namely by passing the pulsed read signal through a low-pass filter with a cut-off frequency that is sufficiently lower than the frequency of the superimposed high-frequency current. In modern optical disk devices, these functions are implemented by bandwidth limitation by circuits made up of photo-detectors and current-to-voltage converter amplifiers, and analog equalizers.

Figure 6:
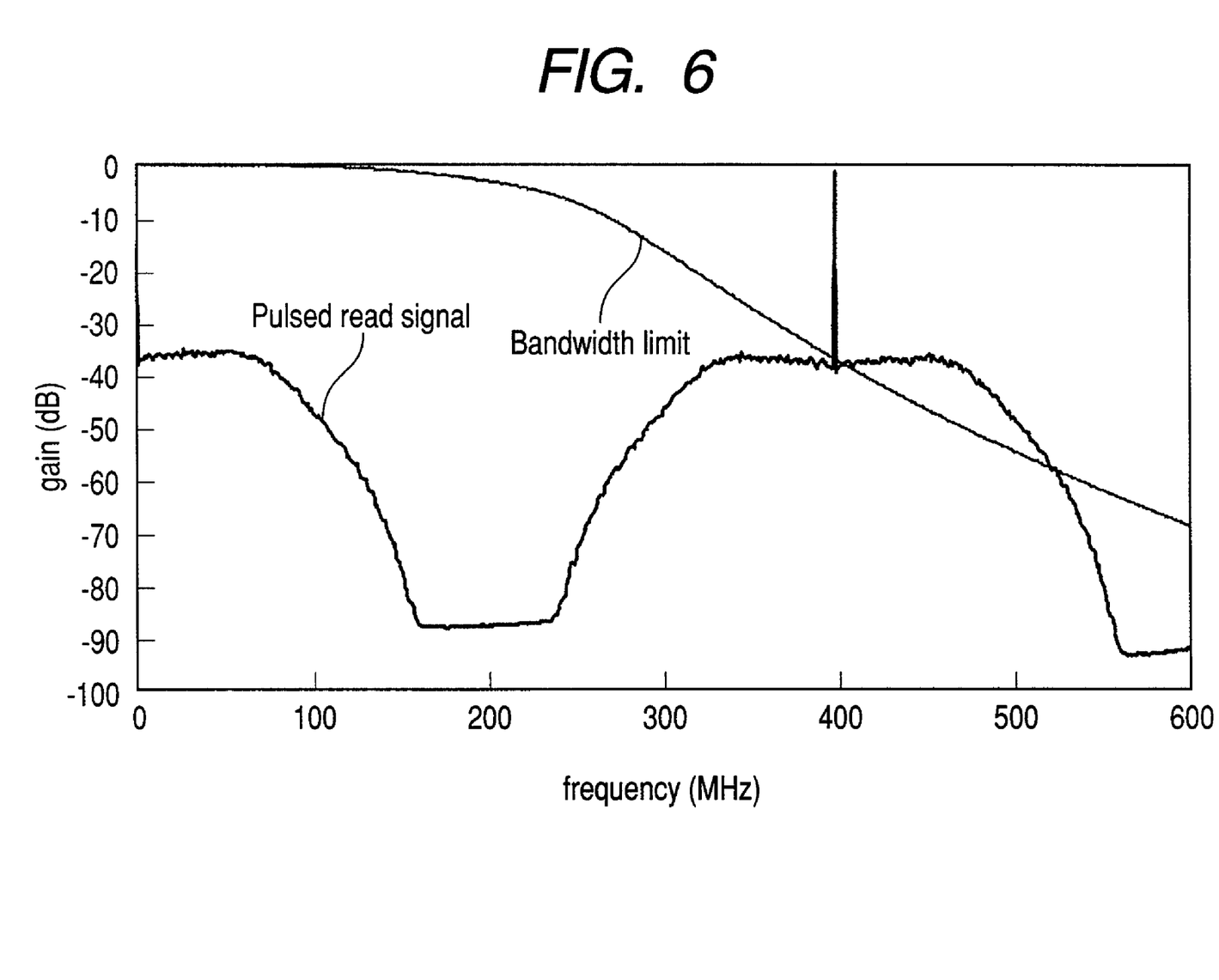
FIG. 6 is a schematic showing an example when separating the read signal from the carrier is difficult.

FIG. 6 shows an example (thick curve) of the pulsed read signal spectrum. The frequency of the superimposed high-frequency signal is 400 MHz and the pulse duty is 0.2. The component near the direct current region is the consecutive read signal. Generation of a pulsed read signal is a sort of amplitude modulation and therefore line-like spectrum of the superimposed high-frequency signal and, the modulated read signal component near that line-like spectrum can be observed. The superimposed high-frequency signal is therefore simply called as carrier hereafter.

The most common carrier frequency may for example be 400 MHz in the case of BD. There should be small carrier frequency difference among such devices because it is determined by the optical path length in the read-optical system.

The read speed of optical disk is limited by the rotation speed of the disk if the linear recording density is a fixed value. The maximum disk rotation speed attainable is limited by the strength of the disk and in the case of polycarbonate disks with a 12 centimeter diameter is approximately 10,000 rpm (revolutions per minute). As is common knowledge to those skilled in the art, there is a high probability that disks rotating at a higher speed will break. The maximum speed attainable by BD is therefore 12× speed. The maximum read speed of practical consumer optical disk drives as of 2007 is 6× BD drive.

SUMMARY OF THE INVENTION

Making the read speed faster of course also widens the read signal bandwidth. The upper limit of the read signal bandwidth in the case of BD is almost as same as the repetitive signal frequency of 2T-marks and 2T-spaces (T: channel clock period), and it is one-fourth of the channel clock frequency. Therefore it is 16.5 MHz for the standard speed (1×), 132 MHz for the 8× speed, and it reaches 198 MHz for 12×. In other words, the upper limit of the read signal band come to close proximity of the carrier frequency at 8× speed or higher.

Figure 4:
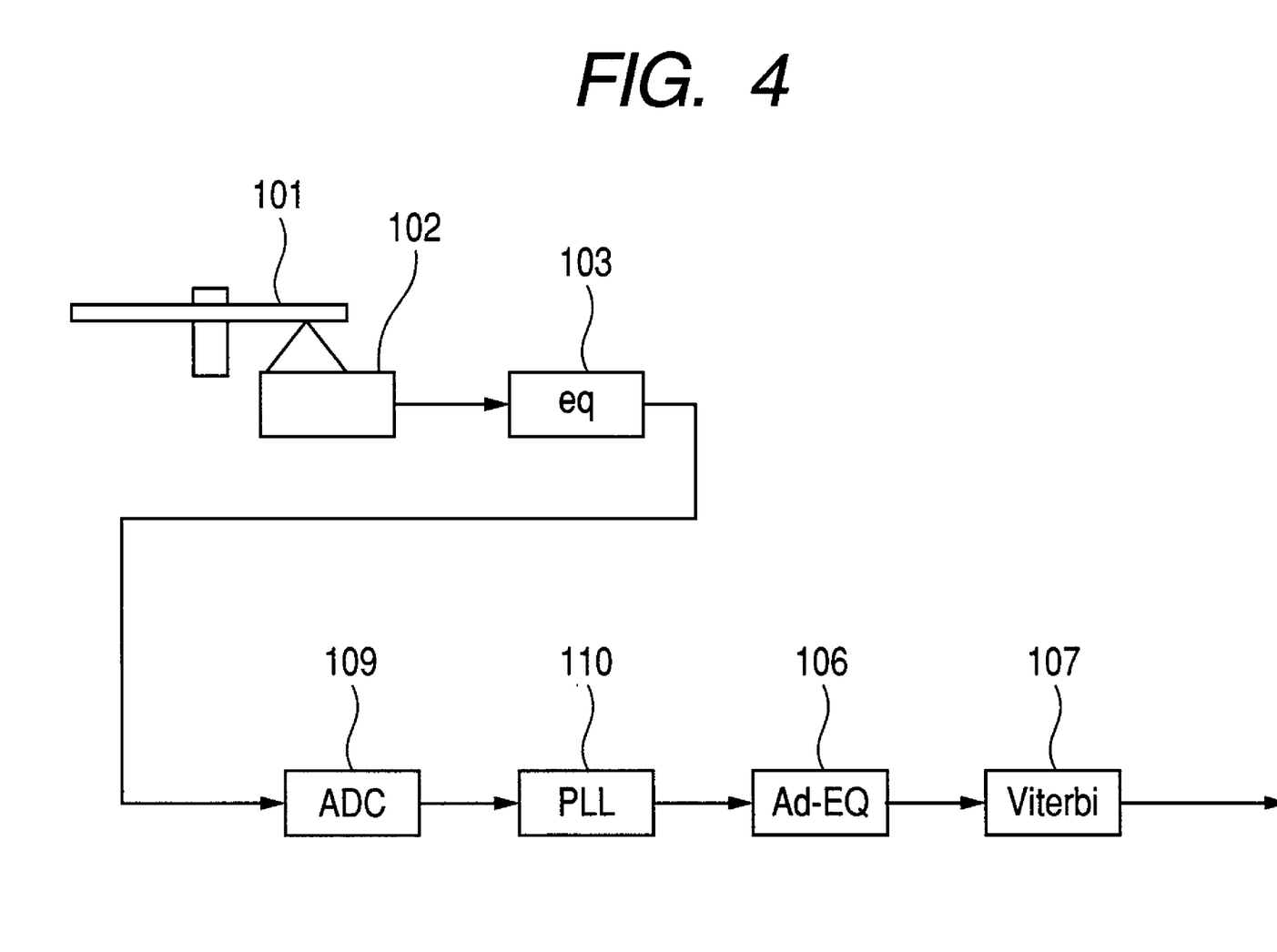
FIG. 4 is a block diagram of a read signal processing system for typical optical disk drives.

FIG. 4 shows a block diagram of a typical signal processing system structure for optical disks. A signal generated in a pickup 102 after reading the disk 101, is equalized in an analog equalizer 103, and then converted to a digital signal in the AD (analog to digital) converter 109. The PLL (phase locked loop) 110 then synchronizes the read system channel clock (sampling clock for AD conversion) to the input read signal clock, and after adaptive equalization by the adaptive equalizer 106, it is decoded into the bit stream by using the Viterbi decoder 107. Each component of this operation is publicly known by those skilled in the art so a detailed description is omitted.

Unless the carrier amplitude is sufficiently attenuated, aliasing will occur during conversion of the read signal to a digital signal in the AD converter if the carrier frequency is higher than one-half the channel clock frequency or in other words, higher than one-half the sampling speed. When aliasing occurs, the results from subsequent signal processing are usually wrong because the digital signal does not reproduce the original analog signal. The level of the carrier signal must therefore be sufficiently attenuated before being input into the AD converter.

Figure 5:
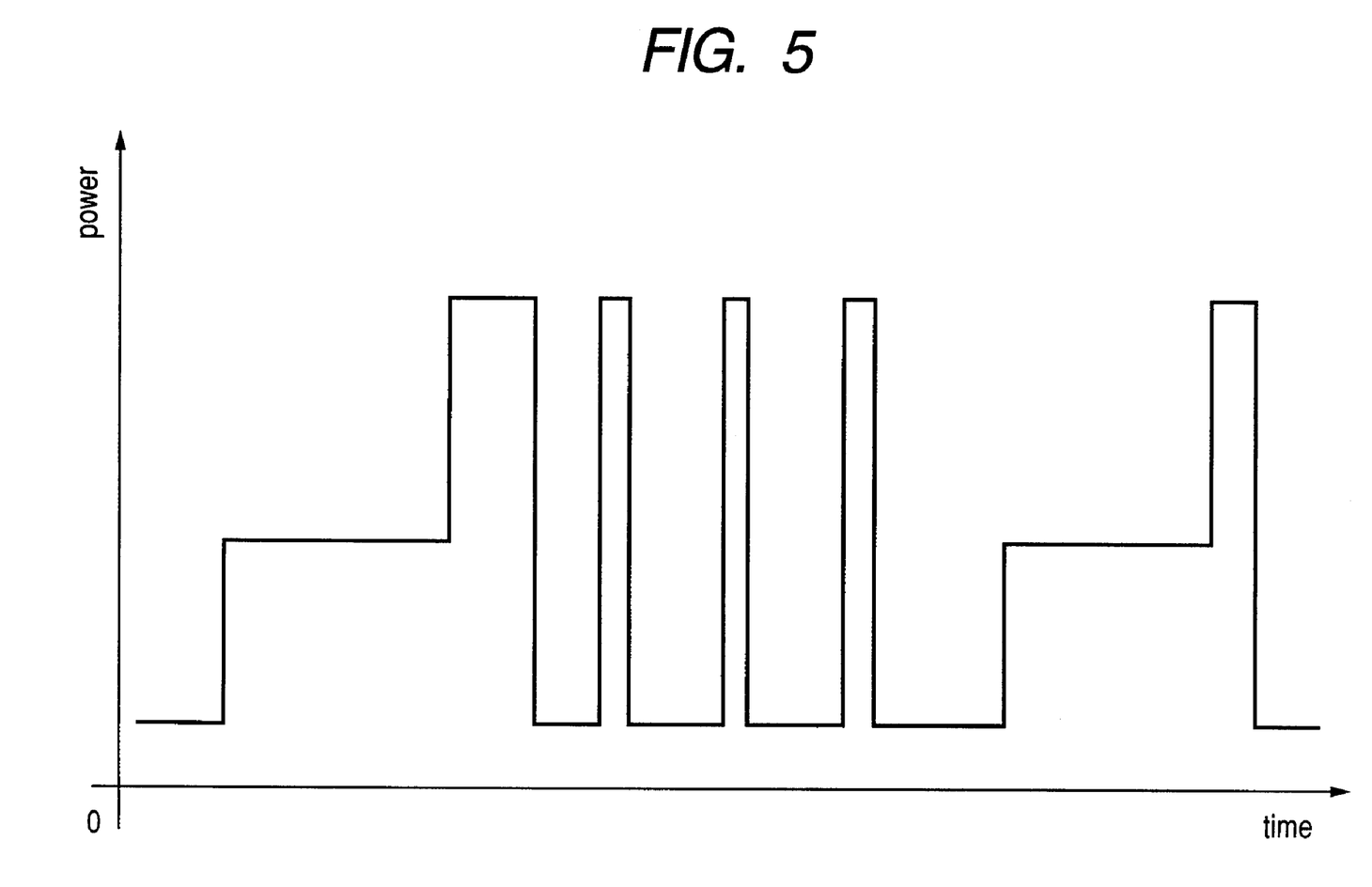
FIG. 5 is a schematic showing an example of the light emission pattern during writing.

FIG. 5 shows an example of the light waveform during writing by the writer optical disk drive. Optical disk drives writes on recording layer of the optical disk by applying heat due to laser beam, so controlling the amount of heat or namely the light waveform applied to the write layer is essential. For example, the rising time and falling time of the light pulse and extent of overshoot affect the write performance. The light waveform is largely determined by the current waveform for driving the laser diode. Usually, a laser driver drives the laser diode mounted in the optical disk drive. A signal transmission line connects the laser driver and the laser diode and the transmission characteristics of this transmission line exert effects on the drive signal waveform. For example, it is difficult to control the shape of a high and narrow waveform caused by pulse overshoot, thus preventing overshoot is usually preferable. Overshoot tends to easily occur when the bandwidth has been widened more than necessary. So the bandwidth of the transmission line joining the laser diode and laser driver should therefore be widened no more than is required.

As described before, when the read speed increased while the carrier frequency fixed, the upper limit of the read signal band nears the carrier. In this state, the read signal cannot be isolated from the carrier frequency due to band limitations due to the system made up from the photo-detector and current-to-voltage converter amplifier, and the analog equalizer. FIG. 6 shows an example of bandwidth limitation a 8× by the analog equalizer and system made up from the current-to-voltage converter amplifier and pulse read signal spectrum. Conditions here were a carrier frequency of 400 MHz and pulse duty of 0.2. The photo-detector bandwidth was assumed as 200 MHz and, the attenuation characteristics as 2nd order Butterworth. The analog equalizer bandwidth and the attenuation characteristics are respectively assumed as 264 MHz and 7th order Butterworth. The thick solid curve (pulsed read signal) in FIG. 6 shows the pulsed read signal spectrum, and the thin solid line shows the bandwidth limitation characteristic of the analog system.

In this pulse read signal spectrum, the component in the vicinity of the direct current is the consecutive read signal. Generation of a pulsed read signal is a sort of amplitude modulation, so it consist the line-like spectrum, which is the superimposed high-frequency signal, and the modulated read signal components in the vicinity of those line-like spectrum. Unless the carrier line-like spectrum is sufficiently attenuated, the carrier frequency will be higher than the channel clock (528 MHz in the present case) or in other words, higher than one-half the sampling speed, so aliasing will occur when converting the read signal to a digital signal in an AD converter. However, when the upper limit of the read signal band come close to the carrier frequency by increasing the read speed, then it will be difficult to isolate the read signal band from carrier frequency by bandwidth limitations of a system made up by the photo-detector and current-to-voltage converter amplifier, and the analog equalizer. In the present case, the carrier attenuation due to the analog system is 37 decibels, so the carrier intensity remaining after passing through the analog circuit is large enough to equal the intensity of the read signal spectrum. In other words, the read signal cannot be separated from the carrier.

Since separation of the read signal from the carrier become difficult because the upper limit of the read signal band come close to the carrier frequency, one method considered to make separation easier is to increase the carrier frequency. However, increasing the carrier frequency requires widening the bandwidth between the laser driver and laser diode in order to match the carrier frequency. However for reasons already described, widening the bandwidth might exert adverse affects on the write performance.

In order to resolve the aforementioned problems, the optical disk drive of this invention includes a digital signal processing system containing a digital low-pass filter. This invention also includes a scheme for changing the carrier frequency during pulse modulation of the light source. This invention further includes an analog equalizer.

The optical disk drive of this invention in other words contains: a light source, a unit for pulse-modulating the light source, an analog bandwidth limitation unit, an AD converter, a digital PLL utilizing the output from the AD converter, a digital low-pass filter, and a Viterbi decoder, in which the frequency for pulse modulating the light source is larger than one-half the AD converter sampling frequency, and is smaller than the frequency after subtracting the read signal bandwidth from the sampling frequency.

This invention is a high speed optical disk drive achieved without adding special hardware and without drastically raising the carrier frequency. Moreover, the optical disk drive is easily rendered compatible with the write system since there is no need to drastically raise the carrier frequency.

DETAILED DESCRIPTION OF THE PREFERRED EMBODIMENTS

Figure 1:
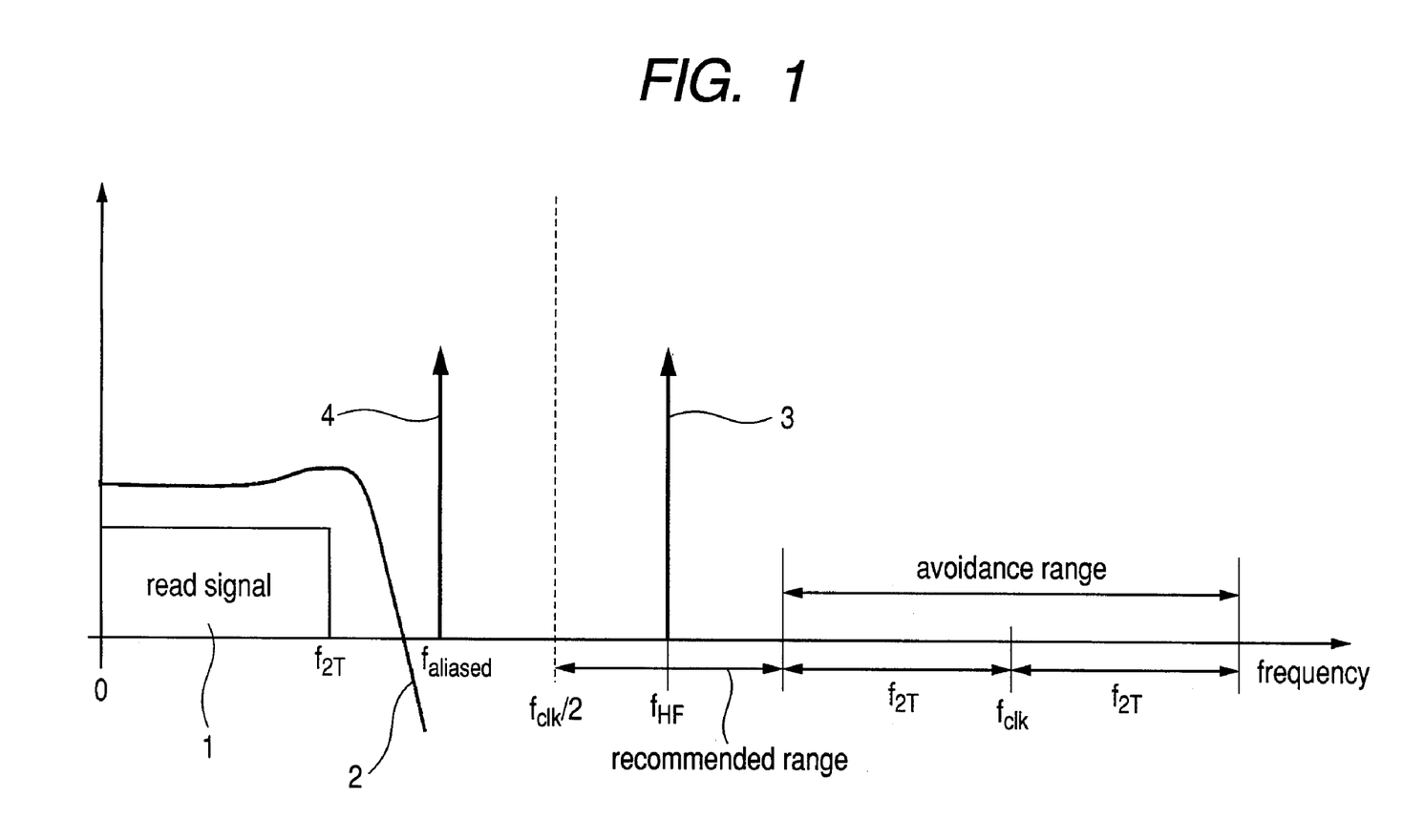
FIG. 1 is a drawing showing the interrelation of the carrier frequency, the channel clock frequency, and the read signal bandwidth when implementing the present invention.

FIG. 1 shows an example of implementation of the present invention. FIG. 1 shows the appropriate carrier frequency conditions required for resolving the above described problems. Here, $f_{HF}$, $f_{clk}$, and $f_{2T}$ denote the carrier frequency, the channel clock frequency, and the upper limit frequency of the read signal bandwidth, respectively. Also, in FIG. 1, 1 denotes the read signal bandwidth and, 2 denotes the schematic of the amplitude transmission characteristics of the digital low-pass filter. Also, the half-lines (rays) shown with arrows in FIG. 1 diagrammatically indicate both the line-like spectrum 3 of the carrier and the line-like spectrum 4 of the alias signal generated by sampling. As shown in FIG. 1, the above described problems can be resolved by placing the carrier frequency within the range specified in the following Formula 1.

$$f_{clk}/2 \leq fHF < fclk - f2T \qquad \text{(Formula 1)}$$

Figure 7:
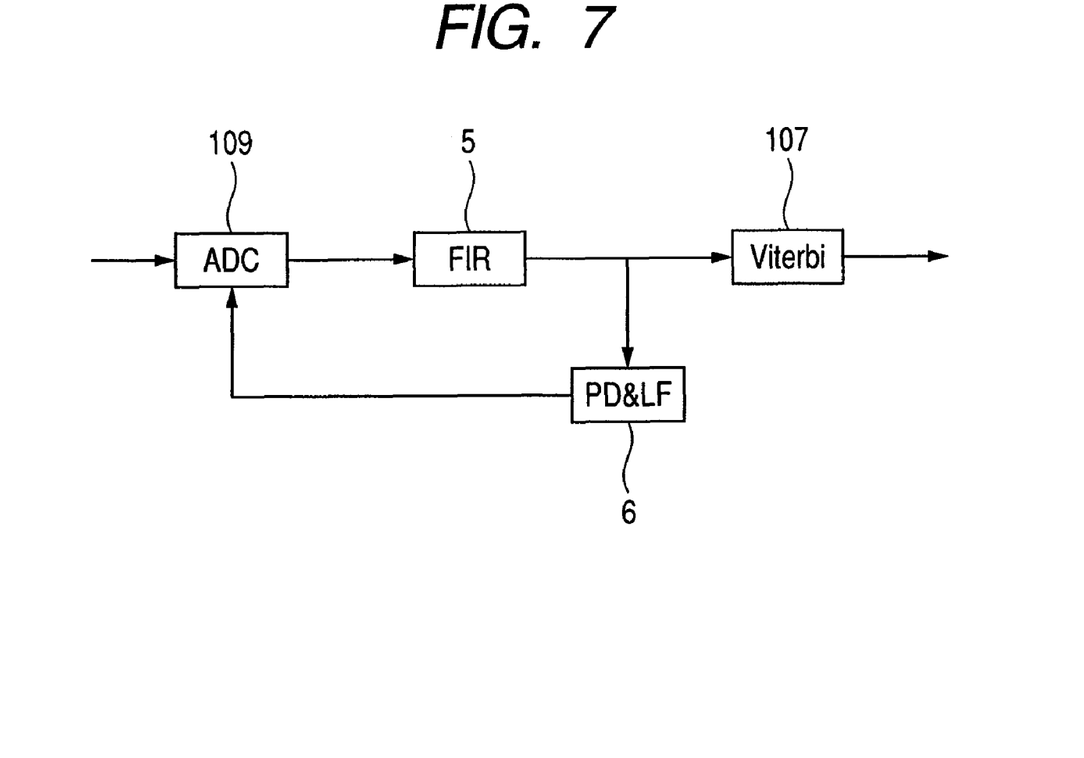
FIG. 7 is a block diagram showing an example of the read system structure required for implementing this invention.

One precondition here is that the signal processing system includes a digital low-pass filter (equalizer) with low-band transmittance characteristics. FIG. 7 shows an example of this type of signal processing system. In this example, a digital low-pass filter 5 is installed directly after the AD converter 109, and the PLL circuit 6 performs phase detection (phase comparison) for PLL on the low-pass filter 5 output. The PLL circuit here contains a phase detector, a loop filter, and voltage controlled oscillator (VCO) that are components needed for PLL operation. The carrier frequency of course satisfies laser noise suppression conditions (set by the optical length from the laser diode within the pickup to the disk) by way of the high-frequency modulation method.

Aliasing occurs when the carrier frequency is set within the range specified in Formula 1 since the carrier frequency is higher than one-half the channel clock frequency. A simple description of this state is given next. The carrier frequency signal is a sine wave, so though the phase increases by 2(fHFt along with the time t, and is sampled at the channel clock frequency (phase increases at 2(fclkt) the phase for sampling the carrier changes by 2((fclk−fHF)t. In other words, the data after sampling is a value equivalent to the sine wave which is the frequency fclk−fHF. Therefore, when the carrier frequency was set within the range specified in Formula 1, the carrier frequency is converted into the frequency range shown in Formula 2 by sampling. By denoting the alias frequency of the carrier as $f_{aliased}$ then, f2T<faliased (fclk/2

(Formula 2)

Here, the digital low-pass filter is a low pass filter whose transmission characteristics allow the read signal to pass through the filter. Namely, the alias of the carrier signal is in the stop-band of the digital low pass filter. The alias of the carrier signal is therefore attenuated by the digital low-pass filter. Therefore, the insufficient carrier attenuation by the low band pass characteristics of the analog equalizer and photo-detector can be supplemented.

That is, the carrier can be sufficiently attenuated by using the digital low-pass filter by making effective use of aliasing to convert the carrier frequency into the stop-band of the digital low-pass filter.

The PLL circuit 6 in FIG. 7 is installed after the digital low-pass filter 5 in order to attenuate the carrier before performing phase detection.

Figure 8:
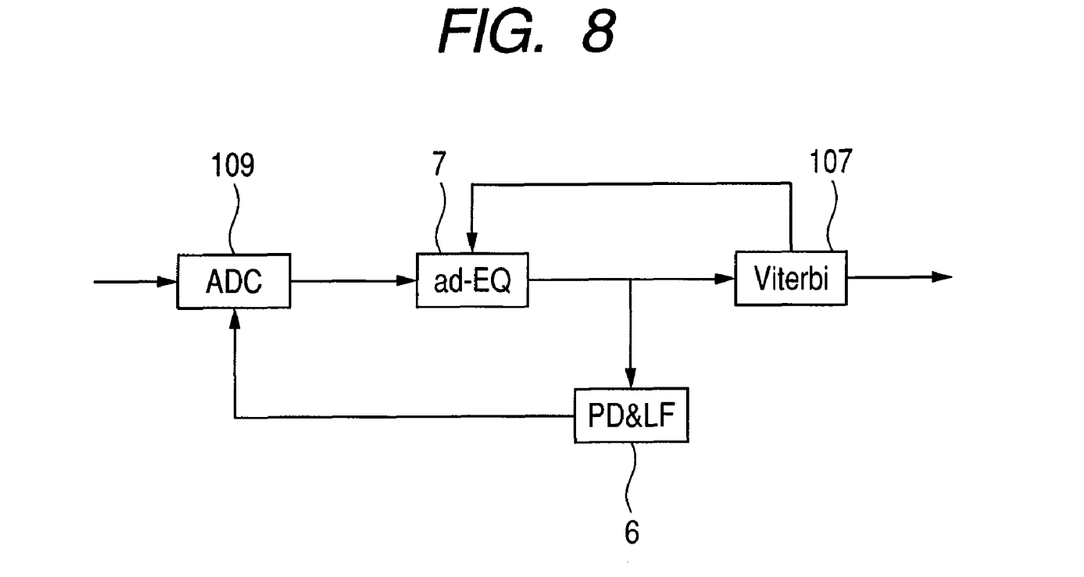
FIG. 8 is a block diagram showing an example utilizing an adaptive equalizer as the digital low-pass filter in the read system required for implementing this invention.

An FIR (finite impulse response) filter may be utilized as the digital low-pass filter in FIG. 7. Further as shown in FIG. 8, this FIR filter may also be an adaptive equalizer linked with the Viterbi decoder 107. Using an adaptive equalizer along with a Viterbi decoder is publicly known by those skilled in the art so a detailed description is omitted here. The adaptive equalizer functions to equalize the read signal to approximate the waveform required by the Viterbi decoder so the adaptive equalizer has characteristics that will attenuate at frequency ranges of f2T and higher. In the present case, the carrier is the unwanted component so the adaptive equalizer device is an effective and convenient way to suppress these components.

Figure 9:
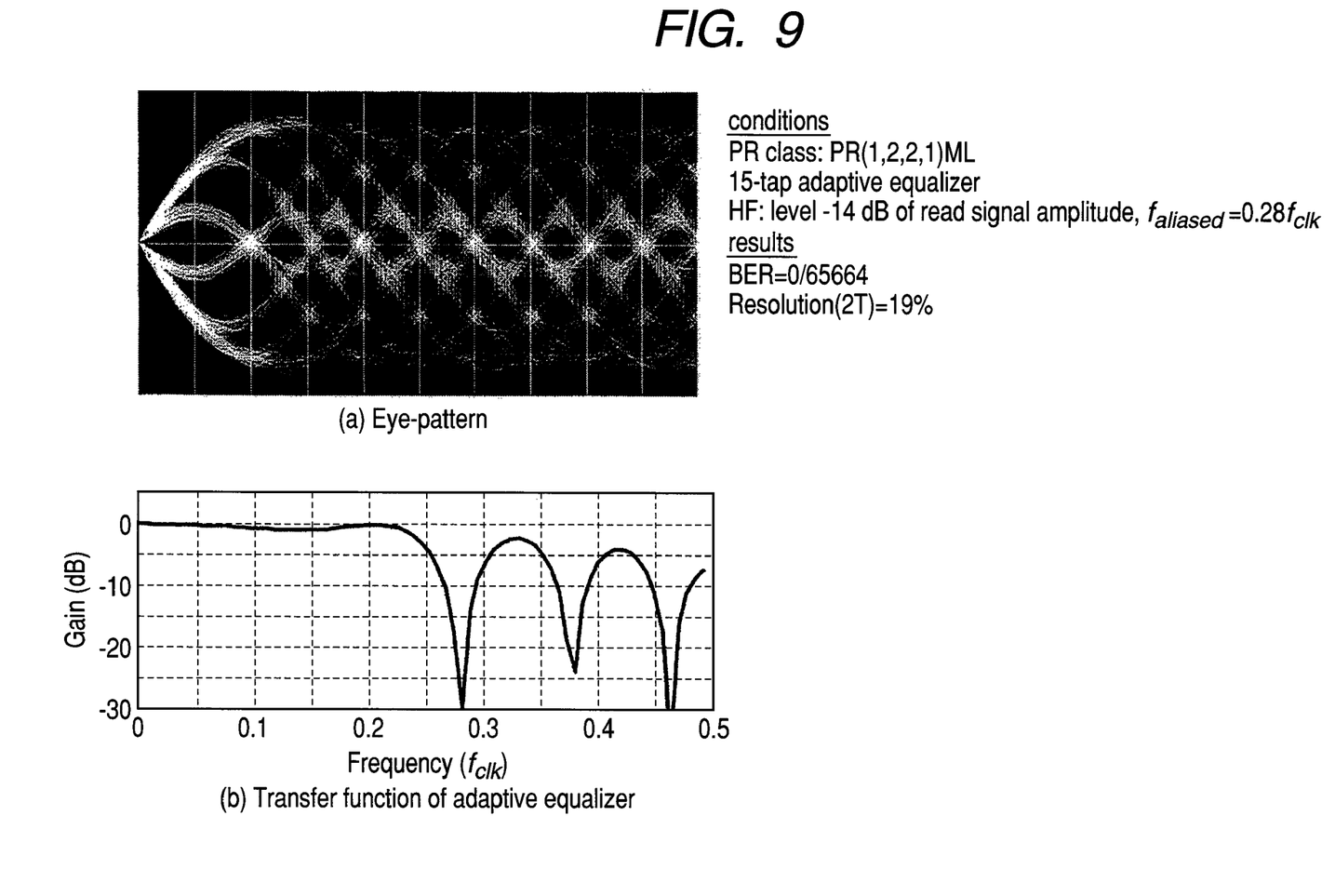
FIG. 9A is an eye-pattern of the output signal from the adaptive equalizer.
FIG. 9B is a graph of the transfer function of the adaptive equalizer showing read signal simulation results when the alias of the carrier frequency is within the attenuation band of the adaptive equalizer.

FIG. 9 shows an example of results from a read simulation and the amplitude transmission characteristics of the adaptive equalizer for the above described case. Conditions for the simulation were; a 25 GB BD was assumed whose amplifier noise amplitude and disk noise amplitude relative to the read signal amplitude were assumed as −29 dB and −19 dB, respectively. The block diagram in FIG. 8 shows the structure of the read system. The number of taps of the adaptive equalizer was 15, and the PR class of the Viterbi decoder was PR (1, 2, 2, 1) ML. The carrier was input as an alias signal generated by AD conversion because this simulation require to apply a read signal which is oversampled at double the channel clock speed. The alias amplitude was set as −14 dB relative to the read signal amplitude, and 0.28 fclk was utilized as the frequency (the frequency in the simulation was standardized to the channel clock frequency). Results from a simulation for reading the 1 RUB (recording unit block) portion of the data showed that the BER (byte error rate) was 0 (0/65664) even though the resolution of the 2T-2T signal was slightly lower than normal case. FIG. 9A is an eye-pattern of the output signal from the adaptive equalizer at that time. FIG. 9B is a graph showing the amplitude transmission characteristics of the adaptive equalizer at that same time. The attenuation is large in the vicinity of 0.28 fclk, and can be observed to make the large amplitude alias signal attenuate compared to the noise level. The 2T-2T signal frequency (0.25 fclk) was also somewhat attenuated.

Figure 10:
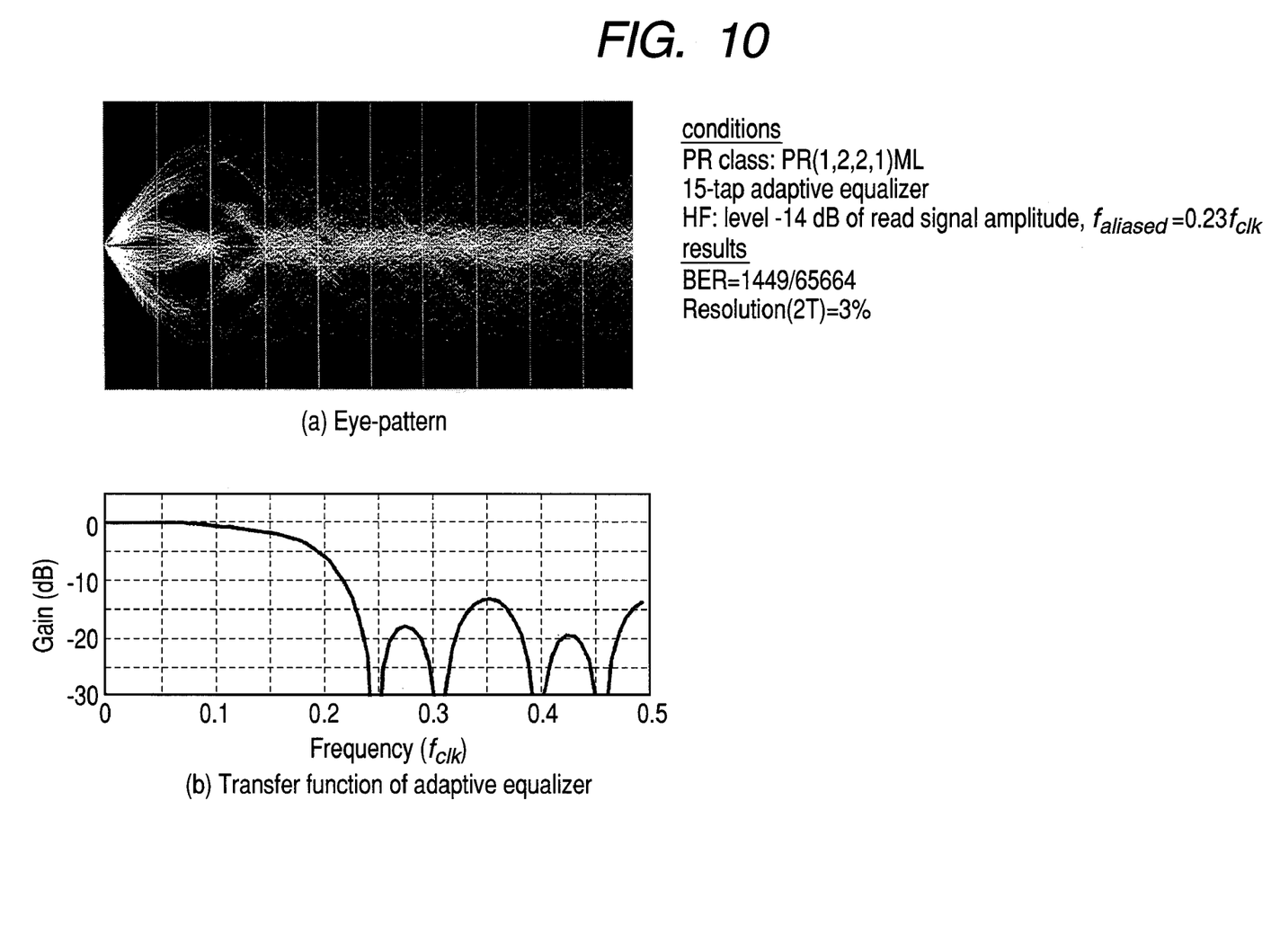
FIG. 10A is an eye pattern of the output signal from the adaptive equalizer.
FIG. 10B is a graph of the transfer function of the adaptive equalizer showing read signal simulation results when the alias of the carrier frequency is within the read signal bandwidth.

FIG. 10 shows the results of a similar simulation when the carrier alias frequency is 0.23 fclk. That is, the carrier alias frequency appears within the read signal bandwidth. Other conditions for the simulation were the same as the case for FIG. 9. The read results were extremely poor with a BER equal to 1449/65664. FIG. 10A is an eye-pattern during the simulation and it can be seen that there was large jitter overall and that the amplitude for the 2T signal was small. FIG. 10B is a graph showing the amplitude transmission characteristics of the adaptive equalizer at that time. Though the operation functioned to suppress the alias signal, it can be seen that the high frequency band region of the read signal was simultaneously suppressed since the alias signal lies within the read signal bandwidth.

It can be confirmed by comparing the above two examples that converting the frequency of the carrier by AD conversion to the attenuation band of the adaptive equalizer is effective.

The present invention is not limited to read signal processing systems using Viterbi decoder as shown in FIG. 4. This invention for example can also utilize to a system using limit equalizers because limit equalizer also require an AD converter.

Some carrier frequency setting ranges satisfying the conditions of this invention for number of speeds are shown in Table 1.

TABLE 1

| speed | $f_{clk}$(MHz) | $f_{2T}$(MHz) | $f_{HF}$(MHz) range |
|---|---|---|---|
| 5 | 330 | 82.5 | 165-247.5 |
| 6 | 396 | 99 | 198-297 |
| 8 | 528 | 132 | 264-396 |
| 10 | 660 | 165 | 330-495 |
| 12 | 792 | 198 | 396-594 |

The analog equalizer can suitably attenuate the carrier when the carrier frequency is about four times greater than the upper limit of the read signal band Therefore when the carrier frequency is around 400 MHz, the read signal and the carrier can be separated at up to 6× speed by attenuation due to an analog equalizer. If using this invention at below 6× speed, then the carrier frequency must be lowered to 297 MHz or below. However, when the carrier frequency is lowered in this way, the problem arises that the optical length between the disk and the laser diode suitable for suppressing laser noise becomes longer. Though the allowable optical length between the disk and the laser diode is limited by the drive design, in actual operation the read speed changes due to the type of disk and demands from the host, so switching, between this invention and carrier suppression by just using the analog equalizer according to the read speed is more practical during actual operation. The laser driver inside the pickup is usually utilized to generate the carrier and so to make this switching possible, the laser driver must be instructed to change the carrier frequency to a suitable level each time the read speed is changed.

Figure 11:
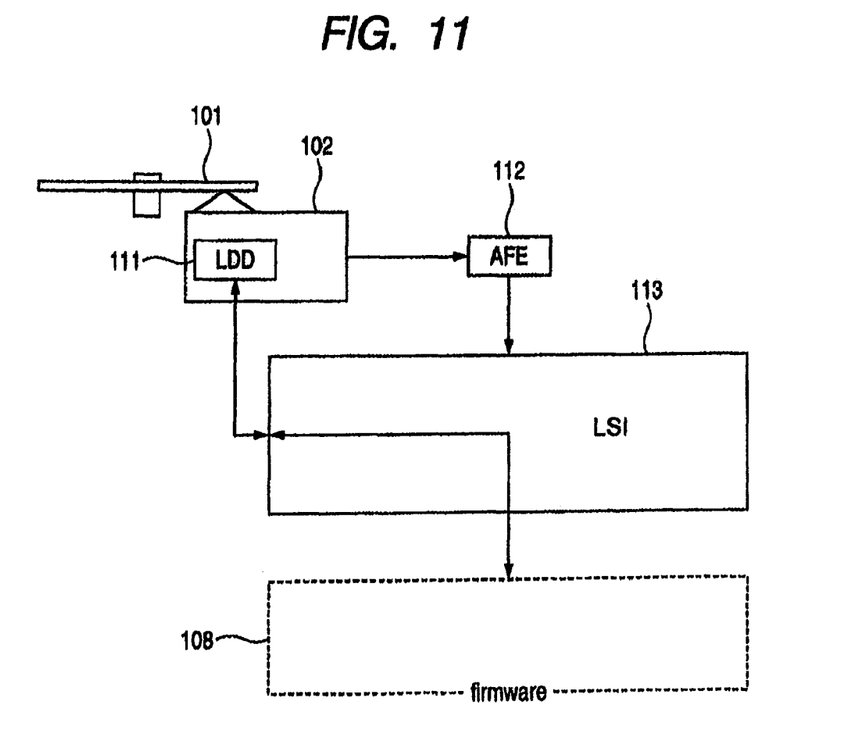
FIG. 11 is a block diagram showing an example of the optical disk drive structure when implementing this invention.

The above state is shown in FIG. 11. A combined large scale integration (LSI) 113 outputs instructions to the laser driver 111. The combined LSI integrates main functions required for the optical disk drive such as the microprocessor, channel, error correction, various types of feedback controllers, and interfaces. Most part of the circuit of optical disk drives in recent years are constructed from a chipset of a combined LSI, an analog front end IC 112 to supplement that LSI, and a laser driver as shown in FIG. 11. The firmware 108 is what actually provides instructions to operate the optical disk drive. The firmware is a program executed by the microprocessor. Besides controlling the different internal functions in the combined chip, the firmware also controls operation of peripheral IC such as the laser driver through interface circuits. The firmware is actually stored in the memory within the combined LSI. After setting the read speed based on commands from the host, the firmware sends setting instructions to the peripheral IC required for that speed via the combined LSI.

The read mode on the optical disk includes a CAV (constant angular velocity) mode. This CAV mode ensures that read is performed at a constant angular velocity that is, the disk is rotated at a fixed rotation speed. A feature of the CAV mode is that it is easy to improve seek performance in random access mode compared to the mode which maintains constant linear speed because there is no need to stabilize the rotation speed during seek. However in CAV mode the line velocity varies during read with changes in the read disk radius. Namely, the channel clock frequency and read signal bandwidth also vary. Therefore, there is a need of applying the technology of this invention during reading in CAV mode, when reading outer circumference part of the disk and the read speed reaches to a level where separating the carrier and read signal becomes impossible. However, there is about a 2.4 times difference in linear velocity between the innermost circumference and at the outermost circumference in case of 12 centimeter diameter disks. For example, in CAV mode with 10× speed on the outermost circumference, the speed on the innermost circumference will be 4.14×. Assuming the case where the carrier frequency is 400 MHz or higher, then the carrier signal can be sufficiently attenuated at the innermost circumference using an analog equalizer. The technology of this invention, however, must be applied at the outermost circumference of the disk.

Figure 12:
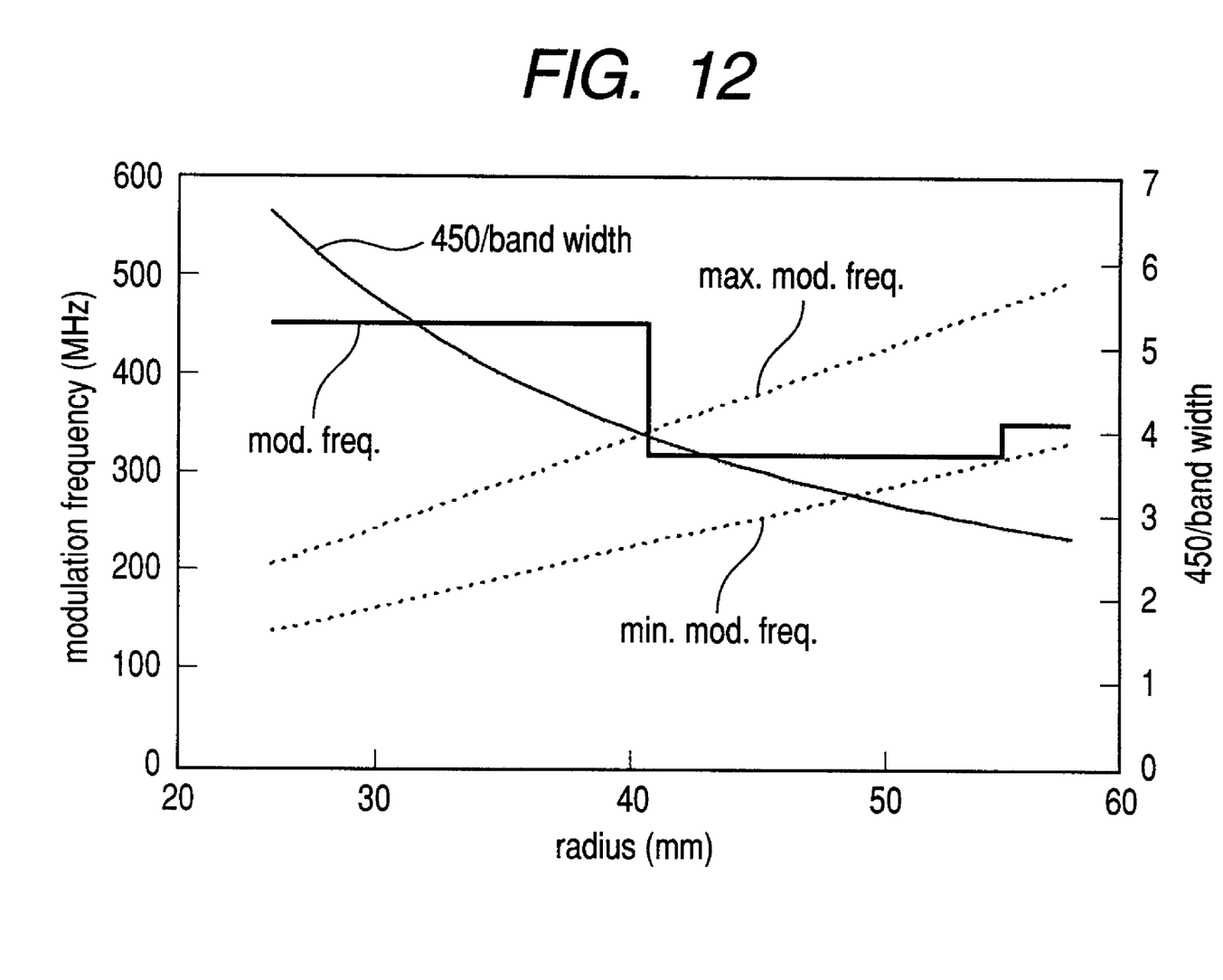
FIG. 12 is a diagram showing an example of the carrier frequency settings during CAV mode read-out at the maximum speed 10 times the standard speed.

Therefore, in high speed CAV read mode, it is required to change the carrier frequency whenever needed depending on the radius that being read. FIG. 12 shows an example of changing the carrier frequency. In FIG. 12, the horizontal axis refers the radius, and the vertical axis on the left side refers the frequency. Here, the carrier frequency is 450 MHz at the inner circumferential side or in other words, in the range where the analog equalizer can adequately separate the carrier and the read signal. The solid curve in FIG. 12 shows the ratio of the carrier frequency versus the upper limit frequency of read signal band at each disk radius in the case where the carrier frequency is 450 MHz. Only this solid curve refers the vertical axis on the right side of the graph. The two straight lines shown with broken lines indicate the lower limit (min. mod. freq.) and the upper limit (max. mod. freq.) of the carrier frequency in the case where this invention was applied. The thick solid line indicates the actual carrier frequency (mod. freq.).

The carrier can be attenuated using the analog equalizer if the ratio of the carrier frequency to the read signal band upper limit frequency is nearly four or larger as described before. However this figure is dependent on factors such as the pulse waveform and duty, and the transmission line bandwidth between the laser driver and laser diode. Here, the carrier frequency is switched at the point when the ratio of the carrier frequency to the read signal band upper limit frequency reaches four. When reading the disk from inner circumference, the carrier frequency is switched from 450 MHz to 320 MHz at a radius of 40 millimeters. This frequency is slightly below the upper limit of the carrier frequency. This is because when the read signal bandwidth upper limit frequency and the alias frequency of the carrier become too close to each other, the adaptive equalizer not only suppresses the alias of the carrier but also suppresses the upper limit vicinity of the read signal bandwidth.

The carrier frequency is maintained at 320 MHz from the 40 mm radius onwards, until reaching close proximity to the carrier frequency lower limit line. On reaching a radius of 55 mm where the carrier frequency nearly reaches the lower limit line, the carrier frequency is then switched to 350 MHz, and this frequency is maintained until reaching outer circumference of the disk. Just as explained, it was required to switch the carrier frequency only twice while reading the entire disk surface from the innermost circumference. If the drive has CAV read modes having different maximum speeds, carrier frequency switching programs like one shown in FIG. 12 should be prepared for each mode.

The present invention is effective on all general optical disk drives.

What is claimed is:

1. An optical disk drive comprising:
   a light source to irradiate an optical disk with light;
   a unit for pulse modulating the light source at a carrier frequency ($f_{HF}$);
   an analog to digital converter for converting an analog signal generated by reflected light from the optical disk into a digital signal at a channel clock frequency ($f_{clk}$);
   a digital PLL (phase locked loop) utilizing the output signal from the analog to digital converter and synchronizing the analog to digital converter; and
   a Viterbi decoder utilizing the output signal from the analog to digital converter and outputting a bit stream;
   wherein a formula $f_{clk}/2 \leq f_{HF} < f_{clk} - f_{2T}$ ($f_{2T}$ is an upper limit frequency of a read signal bandwidth) is satisfied.

2. The optical disk drive according to claim 1, further comprising a digital low-pass filter positioned after the analog to digital converter, wherein the digital PLL performs phase detection on the digital low-pass filter output and wherein the digital PLL internally includes a phase detector, a loop filter, and a voltage controlled oscillator (VCO).

3. The optical disk drive according to claim 1, further comprising a digital low-pass filter positioned after the analog to digital converter, wherein an adaptive equalizer is utilized as the digital low-pass filter.

4. The optical disk drive according to claim 1, wherein during a read operation while rotating the optical disk at a fixed rotation speed, the carrier frequency is determined according to a radius of the optical disk being read.

5. The optical disk drive according to claim 4, wherein, when the ratio of the channel clock frequency to the upper limit frequency of the read signal bandwidth is larger than a predetermined value, the formula is satisfied.

6. The optical disk drive according to claim 1, further comprising a digital low-pass filter positioned between the analog to digital converter and the digital PLL in order to attenuate a signal based on the carrier frequency before performing phase detection.

* * * * *